United States Patent [19]

Hudelmaier

[11] Patent Number: 4,585,356

[45] Date of Patent: Apr. 29, 1986

[54] CONCRETE MIXER TRUCK

[75] Inventor: Gerhard Hudelmaier, Ulm, Fed. Rep. of Germany

[73] Assignee: Ingrid Hudelmaier, Fed. Rep. of Germany

[21] Appl. No.: 595,394

[22] Filed: Mar. 30, 1984

[30] Foreign Application Priority Data

Apr. 5, 1983 [DE] Fed. Rep. of Germany ....... 3312218

[51] Int. Cl.$^4$ .............................................. B28C 5/42
[52] U.S. Cl. ..................................... 366/60; 180/53.8
[58] Field of Search ................. 74/15.6, 15.63, 15.66, 74/15.69; 180/53 R, 53.1, 53.4, 53.5, 53.8; 366/60, 61, 220, 601

[56] References Cited

U.S. PATENT DOCUMENTS

| | | | |
|---|---|---|---|
| 2,661,935 | 12/1953 | Willard | 366/60 |
| 4,244,232 | 1/1981 | Murayama | 74/15.66 |
| 4,388,843 | 6/1983 | Teeter | 74/15.66 |
| 4,462,273 | 7/1984 | Yoshii | 74/15.66 |
| 4,464,945 | 8/1984 | Ertl | 74/15.66 |

Primary Examiner—Philip R. Coe
Attorney, Agent, or Firm—Arnold, White & Durkee

[57] ABSTRACT

The invention relates to a concrete mixer truck having a mixer drum adapted to be rotated by the traction motor of the vehicle through an auxiliary transmission of the traction motor transmission. It is an object of the invention to ensure that the power supplied by the traction motor is effectively available for traction purposes under conditions of increased power demand, such as starting and accelerating, and/or that the torque of the mixer drum does not interfere with gear shift operations. To this effect the invention provides a control means adapted to disconnect the mixer drum rotating transmission from the traction motor transmission during predetermined travel conditions, i.e. under conditions defined by an increased power demand for locomotion of the vehicle. Also included in these conditions is each gear shift operation, as at this instance the torque of the mixer drum is prevented from influencing the rotary speed of the speed shift transmission.

24 Claims, 5 Drawing Figures

CONCRETE MIXER TRUCK

DESCRIPTION

The invention relates to a concrete mixer truck of the type having a mixer drum adapted to be rotated by the traction motor of the vehicle through an auxiliary transmission connected to the traction motor transmission, including control means adapted to disconnect the drum rotating transmission from the traction motor transmission during predetermined travel conditions.

It is generally known to rotate a mixer drum through an auxiliary or power takeoff transmission non-seperably connected to the traction motor transmission of the vehicle. As a result, the rotational speed of the mixer drum is always proportional to that of the traction motor. This results in the considerable disadvantage that there is always an increased torque demand by the drum when the same demand occurs for acceleration of the vehicle, as during starting, gear-shifting and accelerating. The required torque can be very considerable, particularly when the concrete mixture contained in the drum has to be accelerated. The necessarily resulting retarding effect on the acceleration of the vehicle may disadvantageously affect the general flow of traffic, particularly in urban traffic with regulation by traffic lights. A further disadvantage is created by the fact that on gear shifting the considerable torque of the filled drum tends to decelerate the unclutched gear shift transmission to such a degree, that the rotational speed differences resulting therefrom may interfere with the proper gear shift operation and reengagement of the clutch.

It has already been attempted to keep the rotary speed of the mixer drum constant with the aid of hydraulic control means independently of the rotary speed of the engine. This solution does not either, however, offer a remedy for the discussed disadvantages.

It is an object of the invention to provide a concrete mixer truck of the type defined in the introduction, in which the driving power of the engine is available mainly for locomotion demands, and for rotation of the mixer drum only when there are no peak loads in the locomotion mode.

In accordance with the invention, this object is attained by the provisions of the control means adapated to disconnect the drum rotating transmission from the traction motor transmission during predetermined travel conditions.

By properly selecting the respective travel conditions it is possible to ensure that the above discussed disadvantages with respect to the travel of the vehicle are substantially eliminated and that the mixer drum is adequately rotated during travel as required for maintaining the desired properties of the concrete mixture. The travel conditions under which the disconnection of the drum rotation transmission is mainly desirable occurs upon an increased powered demand for travel of the vehicle or on actuation of a gear shift mechanism associated with the traction motor.

A sensor for activating the control means may preferably be of the type that is, or has to be, actuated on or for attaining one of the specified travel conditions. Sensor elements of this type are adapted to be activated in response to the position of an accelerator pedal, such as a limit switch associated with the accelerator pedal, or adapted to be activated both by gear shift actuation and by the accelerator pedal. A signal for activating the control means on actuating of the gear shift mechanism may be generated by any component of the gear shift mechanism that is moved during such actuation. In view of the power demands of the traction motor transmission, the control means may advantageously be designed to be activated only on shifting "UP", as this operation usually entails acceleration of the travel speed. In view of the above discussed braking effect of the drum on the traction motor transmission, however, activation of the control means on each gear shift operation is of particular advantage.

In a particularly advantageous manner the provision of a control means adapted to be activated both by gear shift actuation and by the accelerator pedal ensures activation of the control means both by the gear shift operation and in response to increased power demand.

The same applies when the power demand changes independently of the driver's influence on the engine (e.g. acceleration). The operating condition of the engine can be sensed by simple means at various points and compared to a rated value. In addition to the examples set forth in the claims, the operating condition of the engine may be sensed for instance by measuring the rotary speed of the generator. An additional activation of the control means by the gear shift operations is desirable also in these embodiments.

Providing the control means with a timing relay for limiting the disconnection period of the drum rotation transmission ensures with simple means that there is always sufficient time available for carrying out the various operations leading to activation of the control means, such as starting, accelerating and gear-shifting, before the drum rotating transmission is reconnected. A timing relay of this type can be readily included in the control circuit.

A further timing control possibility is offered by providing a delay relay disposed in association with sensor elements sensing the operating condition of the engine. A retarding relay at the indicated location is advantageously effective for avoiding that any momentous deviation of the engine operating condition from the predetermined value or from a predetermined range immediately leads to disconnection of the drum transmission. Such momentous deviations are practically inavoidable during normal travel. The control means should respond, however, only to genuine changes of the operating condition lasting at least for several seconds.

The construction of the disconnection means between the auxiliary transmission and the drum rotating transmission is preferably a disconnector clutch adapted to be actuated by the control means, the disconnector clutch being either of the electromagnetically operated type or of the hydraulically operated type and connected to a solenoid valve, depending on the construction of the vehicle and/or of the drum rotating transmission. Electromagnetically operated clutches as well as solenoid valves for controlling hydraulic circuits are readily controlled and reliable in operation.

With the auxiliary transmission including a power takeoff shaft associated with the speed change gear transmission of the traction motor transmission provides an embodiment of the power transmission from the traction motor to the drum rotating transmission which is of particularly simple construction and reliable in operation. The effective employ of this construction is rendered possible, however, only by incorporation of the control means according to the invention, as known constructions of this type with a non-disconnectable drum rotation transmission resulted in undesirably high loads on the overall transmission system, particularly during gear-shifting operations.

Exemplary embodiments of a concrete mixer truck according to the invention are depicted in the drawings, wherein.

Figure 1:
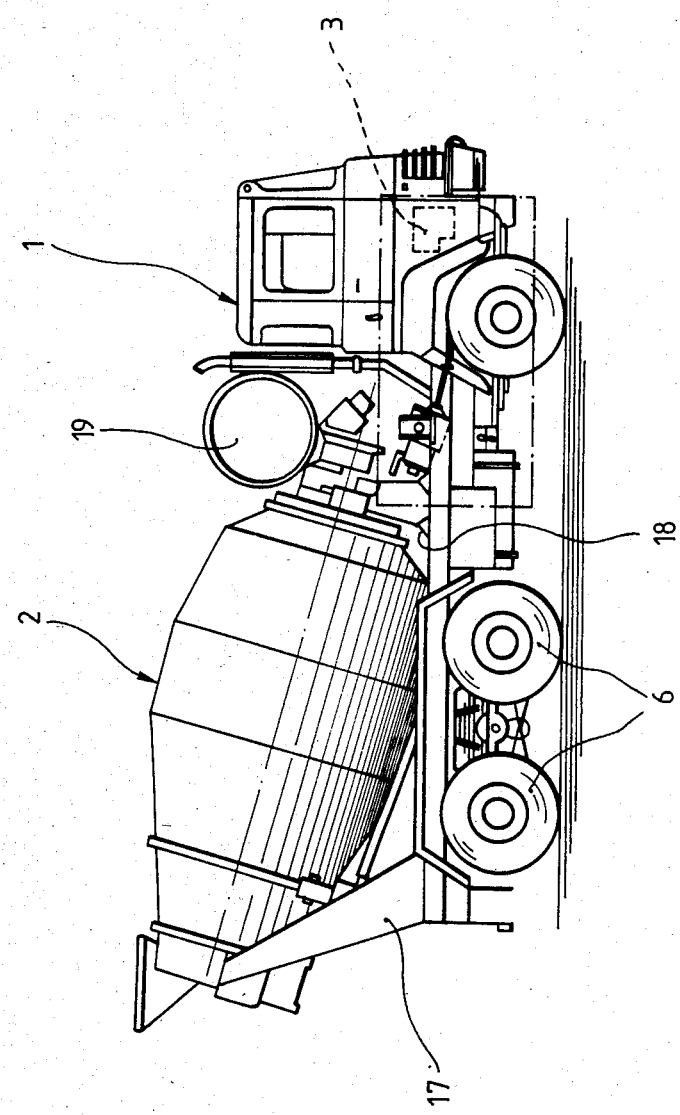
FIG. 1 shows an elevational view of a concrete mixer truck.

A concrete mixer truck shown in FIG. 1 comprises a vehicle generally designated 1 and carrying a mixer drum 2. Vehicle 1 is powered by a diagrammatically indicated traction motor or engine 3 connected to a gear shift transmission 4 having an output shaft 5 for driving wheels 6 of the vehicle. Gear shift transmission 4 and output shaft 5 are diagrammatically indicated in FIGS. 2 and 3, partially in the form of a dash-dot line. An auxiliary transmission 7, generally indicated in FIGS. 2 and 3 by dash-dot lines, leads to a drum rotating transmission generally designated 8. Transmission 8 includes a hydraulic motor 9 located adjacent the drum bottom and connected through a conduit 10 to a hydraulic pump 11. Pump 11 is releasably connected to auxiliary transmission 7 through an electromagnetically operated clutch diagrammatically indicated at 12. In addition the concrete mixer truck shown in FIGS. 1 to 3 has a driver's cabin 13 containing the usual controls such as a gear shift lever 15 and an accelerator pedal 16. Mixer drum 2 is mounted on bearing supports 17 and 18 and has a water tank 19 associated therewith.

Figure 2:
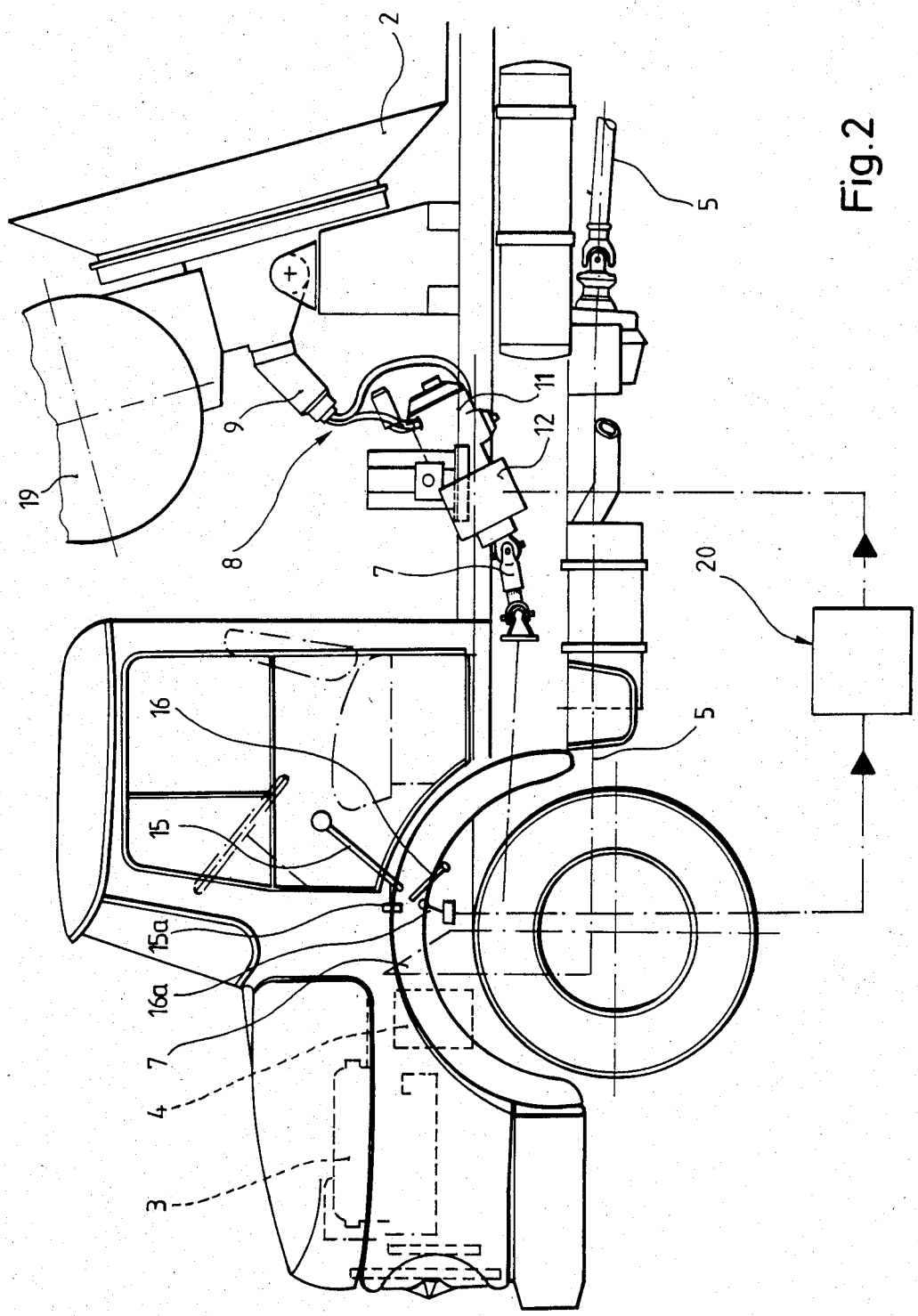
FIG. 2 shows an enlarged view of a portion of the concrete mixer truck with diagrammatically indicated components of a control arrangement.
Figure 3:
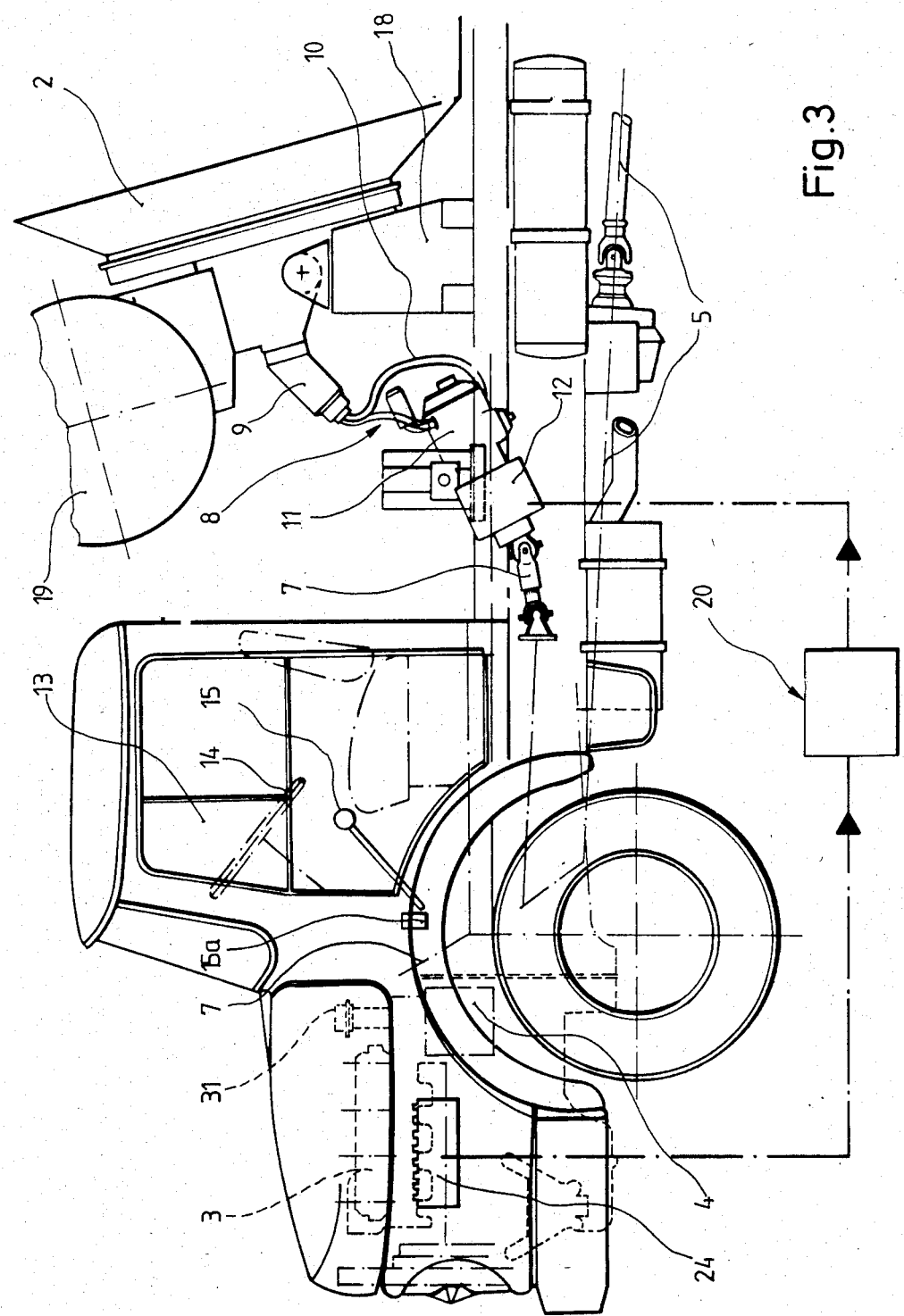
FIG. 3 shows a partial view corresponding to FIG. 2 of a modified embodiment.
Figure 4:
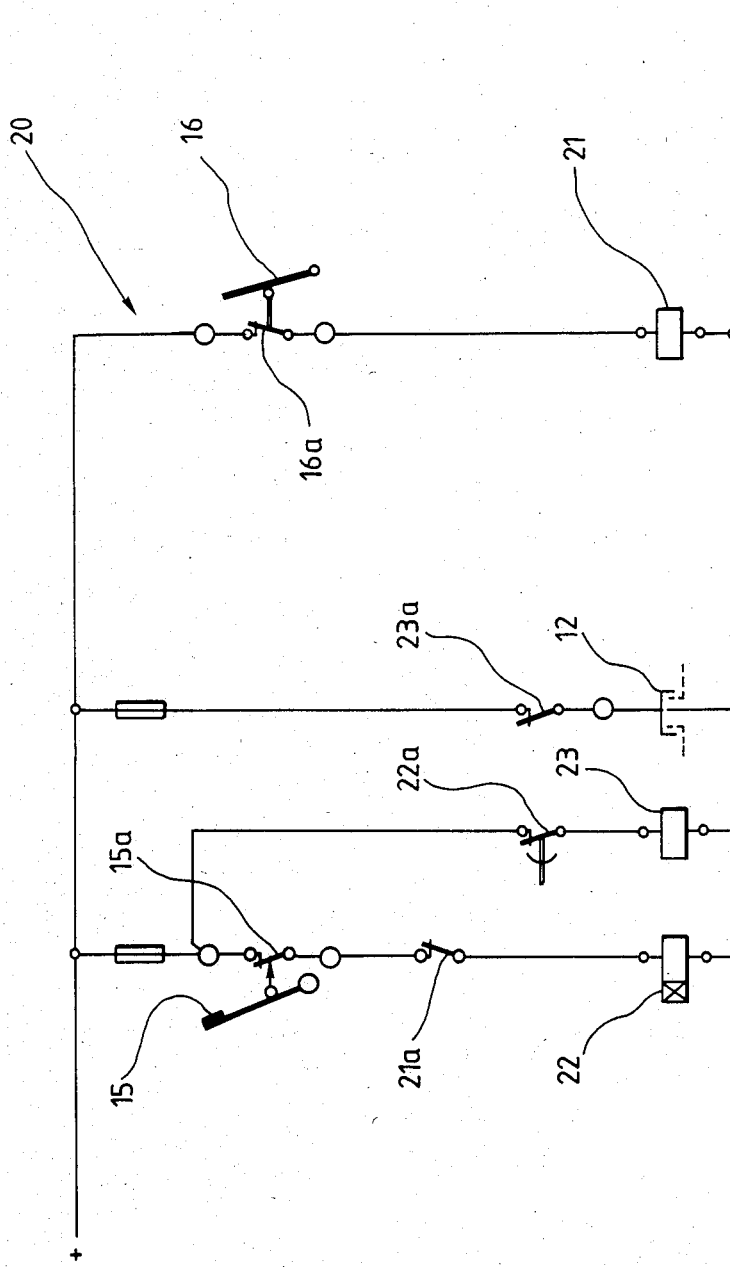
FIG. 4 shows a circuit diagram of a control arrangement.

A control means 20 for actuating electromagnetic clutch 12 is diagrammatically shown in FIGS. 2 and 3 in the form of a control box. A circuit diagram of the control means 20 of the FIG. 2 embodiment is shown in FIG. 4. Control means 20 is designed to be activatable both from the gear shift lever 15 and accelerator pedal 16 for disconnecting the drum rotating transmission.

FIG. 4 shows control means 20 in a condition corresponding to the normal travel mode with the drum rotating, i.e. with the electromagnetic clutch engaged. In this condition a clutch actuating switch 15a associated with gear shift lever 15 is closed. A limit switch 16a associated with accelerator pedal 16 is in its normal open position, resulting in a relay 21 associated therewith being deenergized, so that a contact 21a associated therewith is kept closed. As a result, a timing relay 22 is energized, so that its contact 22a is kept closed. As a result, a further relay 23 is energized to hold its associated contact 23a in its closed position. Electromagnetic clutch 12 is engaged, so that the drum rotating transmission is connected to the traction motor to rotate the mixer drum. Timing relay 22 is adjusted to a predetermined time of for instance twenty-five seconds.

As a gear shift operation is carried out during travel of the vehicle, gear shift lever 15 opens the associated switch 15a. This results in timing relay 22 being deenergized, so that its contact 22a opens to deenergize relay 23, causing contact 23a of the latter to open so as to deenergize electromagnetic clutch 12, whereby the drive transmission to the drum is interrupted. As soon as the gear shift lever switch 15a closes at the end of the gear shift operation, timing relay 22 is energized to close its contact 22a at the end of the predetermined time, whereby relay 23 is energized to close its contact 23a for energizing the electromagnetic clutch, so that the latter is engaged and reestablishes the drive connection for rotating the drum.

A similar process occurs when accelerator pedal 16 is fully depressed so as to actuate the associated switch 16a, as in the case of acceleration. Closing of switch 16a causes relay 21 to be energized to open the associated contact 21a. This results in timing relay 22 being deenergized, whereby electromagnetic clutch is disengaged in a similar manner as described above, so that the drive connection for rotating the drum is disconnected. The full engine power is now available for driving the vehicle. As soon as accelerator pedal 16 is released to open switch 16a, relay 21 is deenergized to close its contact 21a, whereby timing relay 22 is energized to reengage the electromagnetic clutch in the manner described, so that the drive connection for rotating the drum is reestablished.

The control means 20 acts in the same manner when the gear shift lever and the accelerator pedal are actuated simultaneously or in quick succession. In this case, the predetermined time for reengagement of the electromagnetic clutch starts at the instant at which the later one of the two operations is finished.

Figure 5:
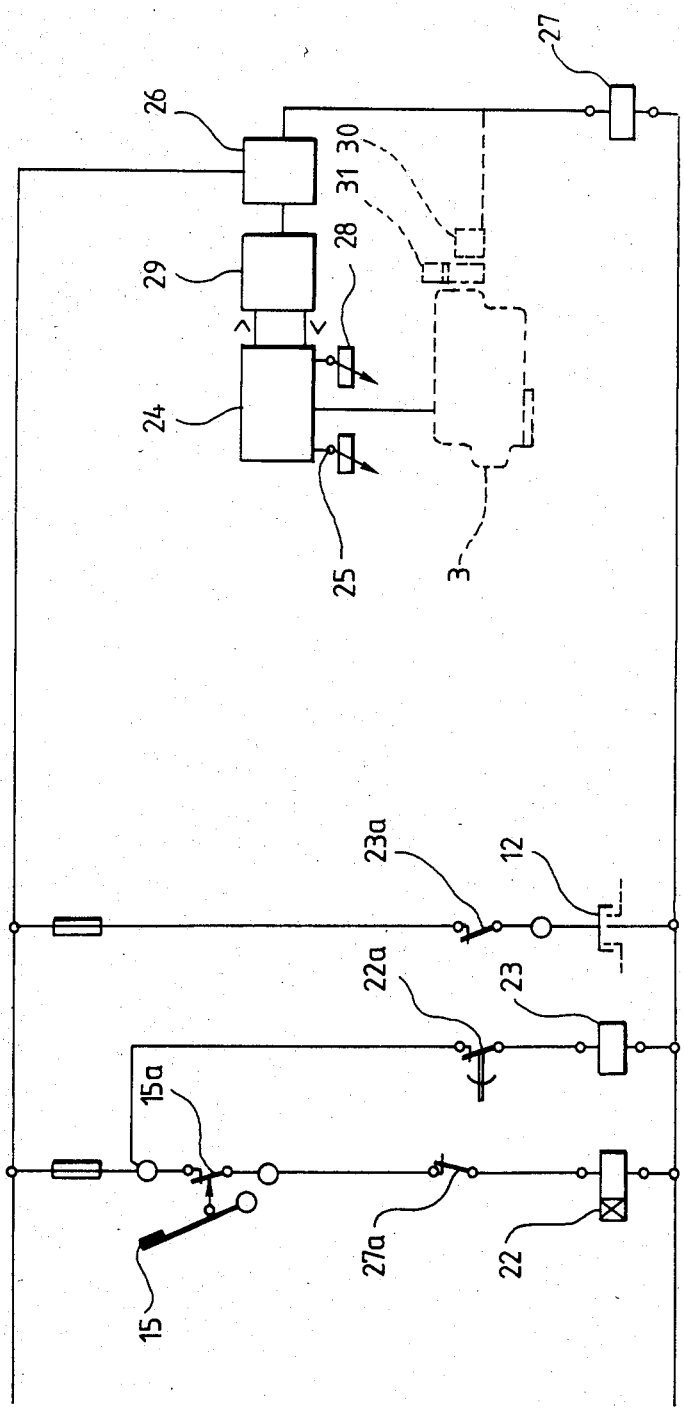
FIG. 5 shows a circuit diagram of a modified embodiment of a control arrangement.

The circuit diagram shown in FIG. 5 belongs to the concrete mixer truck diagrammatically shown in FIG. 3. It includes all of the relays and switches associated with gear shift lever 15 and electromagnetic clutch 12 as well as the timing relay 22 with its contact 22a. The driving connection of the drum is interrupted on each gear shift operation. In this case the operating condition of the engine is taken as the second determining value instead of the position of the accelerator pedal. As shown in FIG. 5 with solid lines, a comparator element 24 is located adjacent traction motor 4 shown in phantom lines. Element 24 compares an actual motor characteristic supplied by traction motor 4 with a predetermined characteristic furnished by a source 25. In case of a deviation, comparator element 24 supplies a signal to an amplifier 26, the output of which energizes a relay 27 to open a normally closed contact 27a thereof disposed in the lead connecting switch 15a to timing relay 22. The process of disengaging and reengaging the drive connection of the drum proceeds then in the manner already described. For avoiding initiation of this process in the case of momentous load peaks, a retarding relay 28 is provided to cooperate with comparator element 24. The desired delay may also be introduced, however, by a repeated comparision process alternating between comparator element 24 and an integrator 29 with the resulting hysteresis.

As an alternative to the motor characteristic comparison described above, FIG. 5 shows an arrangement cooperating with traction motor 4 and including a pressure sensor 30 associated with an injection pump 31 also shown in FIG. 3. In case of a deviation from a pre-set value, pressure sensor 30 controls the energization of relay 27 in the manner described.

In a further alternative (not shown) a revolution counter or the like cooperating for instance with the generator may be used for controlling the energization of relay 27.

Within the scope of the invention it is also possible, of course, that the drive connection of the drum is controlled only by the gear shift mechanism, the accelerator pedal or by an element directly responsive to the operating condition of the motor, if there is no need to take the respective other parameters into account.

Neither is the invention restricted to the employ of an electromagnetically operated clutch for the power transmission to the mixer drum. It is thus for instance possible to employ a hydraulically operated clutch adapted to be actuated via a solenoid valve itself actuated by the described control means. The type of the power transmission between the traction motor and the mixer drum may likewise be varied within the scope of the invention. A power takeoff shaft associated with the speed shift gearbox constitutes a particularly simple and advantageous power transmission arrangement.

I claim:

1. A concrete mixer truck having: a mixer drum; a traction motor; transmission means for rotating said drum operably connected to the traction motor; and control means for automatically disconnecting the drum rotating transmission means from the traction motor during predetermined travel conditions which are defined as an increased power demand for travel of the vehicle.

2. A concrete mixer truck according to claim 1, wherein said control means is activated in response to the position of an accelerator pedal.

3. A concrete mixer truck according to claim 2, wherein said control means is activated by means of a limit switch associated with said accelerator pedal.

4. A concrete mixer truck according to claim 1, wherein said control means is activated by an actuation of a gear shift mechanism associated with said traction motor.

5. A concrete mixer truck according to claim 1, wherein said control means is activated both by a gear shift actuation and by an accelerator pedal.

6. A concrete mixer truck according to claim 1, wherein said control means is activated in response to the operating condition of the engine.

7. A concrete mixer truck according to claim 6, wherein said control means is connected to a pressure sensing element associated with an injection pump.

8. A concrete mixer truck according to claim 6, wherein said control means is connected to a comparator element for comparing the torque characteristic of said traction motor to a predetermined characteristic through a relay adapted to respond to deviations.

9. A concrete mixer truck according to claim 1, wherein said control means is activated both by actuation of a gear shift mechanism and in response to the operating condition of said engine.

10. A concrete mixer truck according to any of claims 6 to 9, wherein a delay relay is disposed in association with sensor elements sensing the operating condition of the engine.

11. A concrete mixer truck having a mixer drum rotatable by a traction motor of the vehicle through a drum rotating transmission connected to an auxiliary transmission connected to the traction motor transmission, including control means for automatically disconnecting the drum rotating transmission from the traction motor transmission during predetermined travel conditions which are defined as an increased power demand for travel of the vehicle, said control means having associated therewith a timing relay for limiting the disconnection period of said drum rotation transmission.

12. A concrete mixer truck according to claim 11, wherein said control means is activated in response to the position of an accelerator pedal.

13. A concrete mixer truck according to claim 12, wherein said control means is activated by means of a limit switch associated with said accelerator pedal.

14. A concrete mixer truck according to claim 11, wherein said control means is activated on actuation of a gear shift mechanism associated with said traction motor.

15. A concrete mixer truck according to claim 11, wherein said control means is activated both by a gear shift and by an accelerator pedal.

16. A concrete mixer truck according to claim 11, wherein said control means is activated in response to the operating condition of the engine.

17. A concrete mixer truck according to claim 16, wherein said control means is connected to a pressure sensing element associated with an injection pump.

18. A concrete mixer truck according to claim 16, wherein said control means is connected to a comparator element for comparing the torque characteristic of said traction motor to a predetermined characteristic through a relay which responds to deviations.

19. A concrete mixer truck according to claim 11, wherein said control means is activated both by actuation of a gear shift mechanism and in response to the operating condition of said engine.

20. A concrete mixer truck according to any of claims 16 to 19, wherein a delay relay is disposed in association with sensor elements sensing the operating condition of the engine.

21. A concrete mixer truck according to claim 1 or 11, including a disconnector clutch actuatable by said control means, disposed between said auxiliary transmission and said mixer drum.

22. A concrete mixer truck according to claim 21, wherein said disconnector clutch is of the electromechanically operated type.

23. A concrete mixer truck according to claim 21, wherein said disconnector clutch is of the hydraulically operated type and connected to a solenoid valve.

24. A concrete mixer truck according to claim 1 or 11, wherein said auxiliary transmission includes a power takeoff shaft associated with a speed change gear transmission of the traction motor transmission.

* * * * *